United States Patent

Berler

[15] 3,673,416

[45] June 27, 1972

[54] HAND HELD PHOTO-OPTICAL READER FOR PRINTED DOCUMENTS

[72] Inventor: Robert M. Berler, Westport, Conn.

[73] Assignee: Pitney Bowes-Alpex, Inc., Danbury, Conn.

[22] Filed: March 19, 1970

[21] Appl. No.: 21,139

[52] U.S. Cl. ............ 250/219 DC, 235/61.115, 250/219 CR, 250/239

[51] Int. Cl. .................. G01n 21/30, G06k 7/00, H01j 39/12

[58] Field of Search ...........235/61.115; 250/219 DC, 219 D, 250/222, 239, 219 CR, 219 DQ; 35/35 A

[56] References Cited

UNITED STATES PATENTS

| | | | |
|---|---|---|---|
| 3,238,501 | 3/1966 | Mak et al. | 235/61.115 X |
| 2,866,279 | 12/1958 | Surber | 35/35 A |
| 3,424,912 | 12/1969 | Sargent | 250/219 CR |
| 2,922,893 | 1/1960 | Ett | 250/219 DQ |

OTHER PUBLICATIONS

Smith et al., Summary Report on the Development of A Reading Machine for the Blind, Aug. 20, 1964 page 1, 2, 3.

*Primary Examiner*—James W. Lawrence
*Assistant Examiner*—T. N. Grigsby
*Attorney*—Arthur J. Plantamura

[57] ABSTRACT

A reader which is designed to be held in the hand and to be scanned over a document for reading intelligence contained on the document in the form of printed code. The reader contains no moving parts and comprises essentially a housing with a reading aperture through which the printed matter is exposed, a photo electric cell array to sense the coded print, and a lens positioned so as to focus the printed information obtained through the aperture onto the photocell array; a light source whose direct light is shielded from the photocells is positioned contiguous to the aperture to shed light on the printed matter to be read.

5 Claims, 7 Drawing Figures

PATENTED JUN 27 1972 3,673,416

INVENTOR.
ROBERT M. BERLER
BY
Arthur J. Plantamura
ATTORNEY.

HAND HELD PHOTO-OPTICAL READER FOR PRINTED DOCUMENTS

CROSS-REFERENCE TO RELATED APPLICATIONS

In the copending application of Robert M. Berler, filed on July 29, 1969, Ser. No. 845,860, titled Hand Held Coded Document Photo Optical Reader, now U.S. Pat. No. 3,621,265 a device is disclosed which functions to read a punched hole ticket. Because that unit is designed for use in conjunction with punched hole tickets, the ticket must be physically inserted into the reader to permit light to pass through the holes to be sensed. This precludes use of that reader with a ticket which is firmly adhered to, or is printed as a part of, a surface.

Copending application of Robert M. Berler, Ser. No. 875,473, titled Hand Held Printed Ticket Reader, filed on Nov. 10, 1969, now U.S. Pat. No. 3,600,593, comprises a reader which does permit the reading of a coded printed ticket which may be adhered to a surface. The reader described in that application, however, contains a movable mechanism; this feature permits the reader housing itself to remain stationary in position over the document to be read while the mechanism is operated to scan the print on the document. The present invention provides a novel reader for printed code which has no moving parts; in the reading scan the reader is merely drawn or stroked over the ticket to read the coded information printed thereon.

BACKGROUND OF THE INVENTION

One of the more advantageous uses of the reader of the invention resides in its application at the checkout counter, i.e. at the point of sale, in retail stores, accordingly, the background of the invention will be considered in connection therewith. However, it will be understood that the reader may be applied in various other situations.

In most cases, merchandise tickets are attached to merchandise in retail stores to record price, stock or part number, and sometimes department number. When customer-selected merchandise is brought to the sales clerk or checkout counter, he refers to the ticket when writing a sales slip. A copy of the slip is retained by the store for later recording details of the transaction for accounting and inventory records. This function is usually performed manually, and is tedious, time-consuming and vulnerable to errors of entry. As conventionally performed, these transactions account for a considerable loss of store revenue through lost clerk time, delay in customer service and in errors of collection and recording. The advantages of recording a transaction at the time of, and at the point of, sale are therefore apparent. While hand-held devices for reading coded documents have been proposed heretofore, including those of the hereinabove mentioned U.S. Pat. No. 3,621,265 and 3,600,593, the device of the present invention offers certain novel and distinct advantages relating both to increased fields of utility and to simplicity.

SUMMARY OF THE INVENTION

The reading device of this invention comprises a combination of no optical scanners or other moving parts; it is desired to read sequentially a plurality of lines on a printed ticket preferably limited to five columns. A simple lens images, one line at a time, all five columns into five corresponding photo cells as the reader is drawn over the columns. A single derated long life lamp illuminates the document. Scanning action is accomplished by stroking the bottom end of the reader over the length of the ticket as if drawing a line over another line with a pencil. No special means is required to effect reading when the ticket reader is drawn along the length of the ticket in the scanning action. However, a reference guide to direct the reader in a straight line is preferably placed on the ticket. The reference line may be the edge of one side of the ticket or a pre-printed guide line; preferably an abutting guide such as a long slit, an embossed or debossed edge, a fold, and the like may be placed on the ticket to help guide the reader as it sweeps over the ticket. Because of its simplicity and relatively large tolerance, the reader can read glued down tickets, even those secured on curved surfaces such as cans of food. It can read tickets of almost any desirable length.

OBJECTS OF THE INVENTION

It is an object of the invention to provide a hand held photo optic reader containing no moving parts for reading printed coded information.

It is another object of the invention to provide a hand held printed coded information reader which is inexpensive to manufacture, requires little skill to operate, is compact yet light in weight and requires a minimum of maintenance.

It is still another object of the invention to provide a hand held reader which is particularly adapted to read documents (affixed to articles of merchandise) at the point of sale including tickets attached by way of a cord to merchandise as well as tickets securely pasted to flat as well as curved surfaces.

Additional objects and advantages will be apparent from the description which follows.

DESCRIPTION OF THE PREFERRED EMBODIMENT

The apparatus of the present invention is an optical ticket or card reader that reads a printed coded format by optical means. It will be understood that the reader of the invention may be adapted to read various types of printed documents. However, it will be described herein in connection with a printed ticket type format, such as the kind conventionally used on articles of merchandise for retail. Using documents of this type, the reader is able to read the printed information from a ticket which is secured flat on the article or attached thereto, for example, by a string or cord passing through a hole in the ticket.

While the size of the device of the invention may vary significantly, because of its simplicity it need be no longer than about the length of a pencil.

Figures 1, 2, 3, 4, 6, 7:
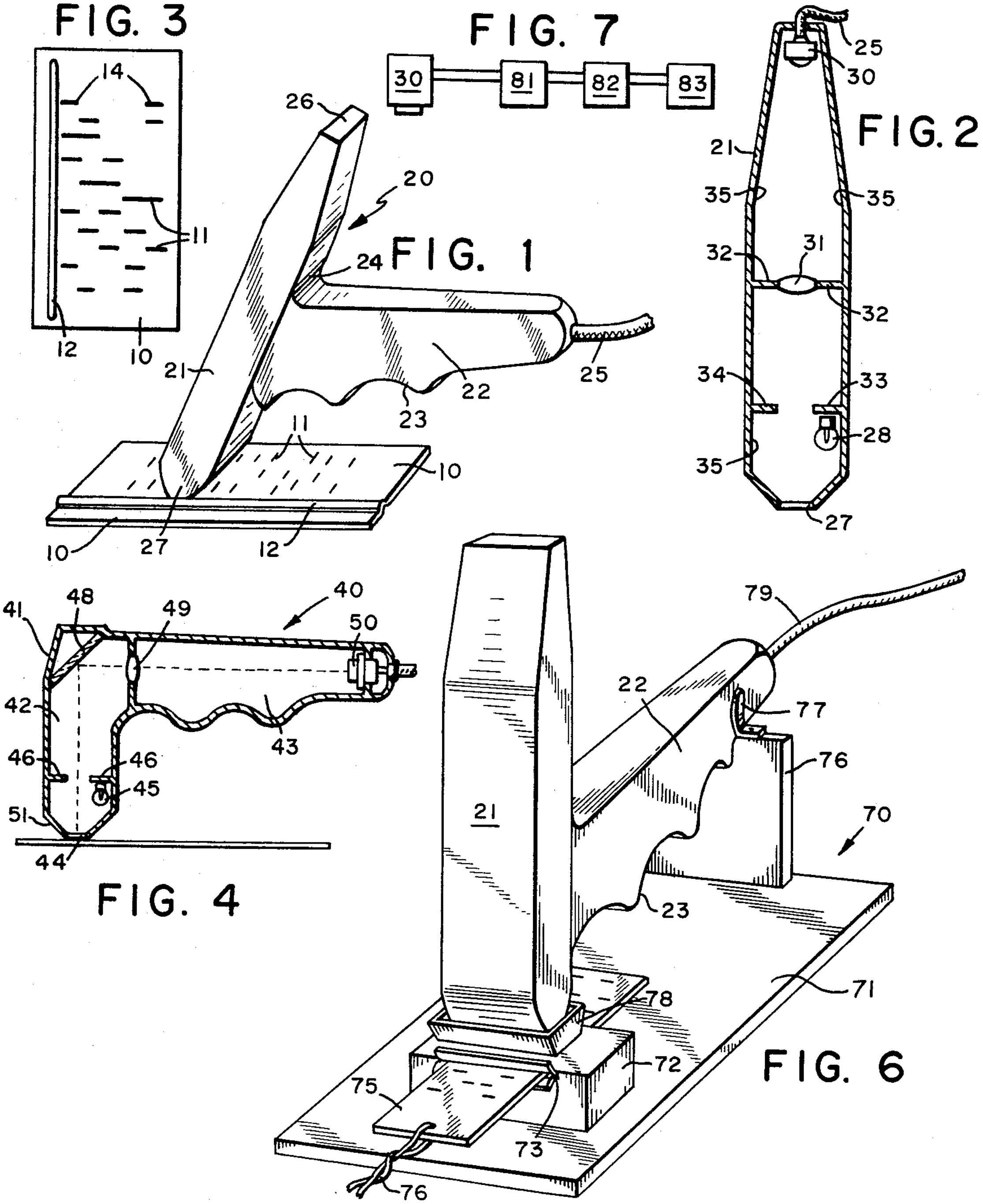
FIG. 1 is a perspective view of the hand held reading device in position on a document which contains information in printed code.
FIG. 2 is a longitudinal cross-sectional view of a reader of the type shown in FIG. 1 illustrating the functional elements included therein.
FIG. 3 illustrates one form of coded document which may be read by the device of the invention.
FIG. 4 is a cross-sectional view of an alternate embodiment in which the reader includes a reflector in the print reading path.
FIG. 6 illustrates a use of the reader on a stand so arranged that tickets may be fed to it as the reader remains stationary.
FIG. 7 is a block diagram showing a simple logic circuit useable with the reader of the invention.

Referring to FIG. 1, a reader 20 of the type contemplated by the invention is illustrated in position on a ticket or document 10 on which information is imprinted in code 11. The essential components of the reader 20, as shown in FIG. 2 are contained in a relatively slender housing 21 which may be handled by the operator not unlike a pen or pencil. To make the reader more comfortable or convenient to manipulate, a handle 22 suitably provided with grips 23 may optionally be attached to the housing 21 at 24. An electrical connection leading through handle 22 from the photoelectric sensors is shown at 25. In a unit in which the handle 22 is omitted (not shown) the electrical connection would emit instead from the top 26 of housing 21.

Referring to FIG. 2, it is seen that the reader housing 21 contains all of the functional components for document reading; the housing 21 acts also as a light tight box for the optics involved. When in use, reader 20 is placed over the ticket 10 so that the reading aperture 27 straddles a line of coded marks 11. A self-contained long life lamp 28 shining through aperture 27 illuminates the portion of the ticket 10 to be read. The coded marks 11 on the ticket are imaged by the lens 31 into the photocell array 30 at the top of the housing 21. The size of the reading slit or aperture 27 is of sufficient width and breadth to allow a single line of code 11 five columns wide (printed across the width of ticket 10) to be imaged simultaneously on the photocell array 30, i.e., a single digit in coded form requires one line, five columns wide. The lens 31 is suitably supported at 32 approximately midway between the aperture 27 and photocell array 30. Light baffles 34 inhibit direct light impingement on the photocell array 30 and preclude erroneous light pickup. Also, preferably, the inner surfaces 35 of the housing 21 are blackened or otherwise provided with a dull surface to preclude internal light reflection.

Lens 31 is of conventional form and may, for example, comprise a simple double convex lens 18 mm in diameter with a focal length of 38 mm. The photocell array 30 is of a commercially available type such as model FPA-700A Fairchild Semiconductor, Fairchild Camera and Instrument Company. This array contains 9 photocells with a spacing of 0.1 inch center to center. Every alternate or second photocell is used which provides the reader with five cells whose spacing between active cells is 0.2 inch center to center. The active photo area is less than 0.05 inch in diameter.

The reader is designed to have a 1:1 ratio between image and object size. With these above conditions, the ticket illustrated in FIG. 3 will allow for substantial alignment tolerances in the use of the unit as a hand held reader.

The lamp 28 is of commercial type, e.g., a Chicago miniature lamp type 2181 (marketed by Chicago Miniature Lamp Company) which has a normal lifetime of 50,000 hours when operated with a filament voltage of 6.3 volts. However, since the lamp is de-rated to 4.5 volts, its life is increased many times its rated life; also, lamp blackening is greatly minimized.

It will be apparent that because the reader is capable of reading a single line (or digit) at a time, in order to properly read an entire ticket (or sequence of coded digits), the reader must be drawn along the ticket in such a way that the reading aperture will correctly straddle each line, one at a time. Because of the optical arrangement described above, the reader has a substantial tolerance level insofar as reader misalignment on the ticket is concerned; this tolerance level of ticket alignment may be controlled significantly and thereby greatly lessen frequency of error by a combination of reader and ticket design.

Referring to FIG. 3, a reproduction of one type of a suitable printed document 10 readable by the reader of the invention is shown. A guide line 12 is shown running down the left side of the ticket. A guide line is advantageously employed, along which the reader is drawn, to assist in a more reliable reading. However, the presence of an independent guide to help direct the reader in a straight line scan is not critical. In operation, the reader is positioned in such a way that it is in contact with the ticket just above the top coded line 14. The left side of the reader skid is placed over the guide line 12. The reader is then drawn along the guide line from top to bottom, as if tracing over the line, to effect a readout of the coded information.

The guide line 12 on document 10 may take several forms; it is preferably formed as a part of the ticket such as by embossing, grooving, crimping and the like, as described in greater detail in the copending application of Allan Borows, Ser. No. 21,138, filed on even date herewith, so as to provide a physical means to hold the reader in better alignment, and further minimize chance of error, as the reader scans the ticket. A guide of this kind, against which the reader abuts, is particularly advantageous in reading a document placed on a curved surface such as a can or in reading a ticket through a plastic transparent wrapping, for example.

Referring to FIG. 4, an alternate embodiment having a pistol resembling configuration is illustrated wherein the height of the reader, relative to that of FIG. 1, can be substantially curtailed. The reader 40 comprises a housing 41 formed by a substantially vertical part 42 having a reading aperture 44 in its base, a lamp 45 to illuminate the document print and baffles 46 to prevent direct light from the lamp 45 from reaching the mirror 48, and a substantially horizontal part 43. The mirror 48 is adjusted in position in the housing of reader 40 so as to reflect the printed image, received through the aperture 44, through lens 49 and upon the photocell array 50 as shown by the broken line.

A skid or sled element 51 which contacts the ticket may be formed as an integral part of the reader housing and may be provided with a notch or other configuration to accomodate a guide line 12 or groove formed on the ticket. Various guide forms for tickets and for complementary reader skid faces (corresponding to 27, 44 and 60 in FIGS. 1, 4, and 5, respectively) which contact such tickets are described in the aforementioned patent application of Allan Borows.

Figure 5:
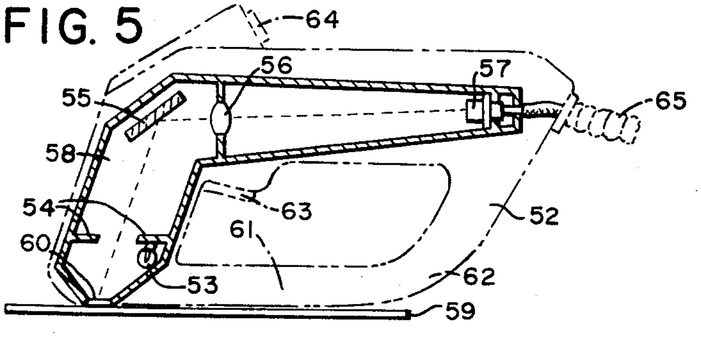
FIG. 5 illustrates in cross section still another embodiment which employs a closed loop handle.

In the alternate embodiment of FIG. 5 a reader housing 51 is shown with elements arranged similarly as in FIG. 4. The housing 51 is incorporated into a handle 52 which forms a closed loop. The lamp 53, baffles 54, reflecting element 55, lens 56 and photo optic sensor 57 contained in housing 51 function in the manner described hereinabove in connection with FIG. 4, i.e., light from lamp 53 (which is shielded from direct reflection onto mirror 55) illuminates the print on ticket 59, the print is reflected by mirror 55 through lens 56 to the photo-optical sensor array 57. The closed loop arrangement of handle 52, offers more stability when the reader is used on flat surfaces because of the horizontal base 61 extending from the reader aperture 60 to the heel 62 of the rear portion 52 of the handle, substantially all of which is in contact with the surface upon which the printed document is secured. A suitable finger switch 63 and/or thumb switch 64 may be provided to activate the reader.

If desired, the reader may be accommodated so as to receive tickets such as illustrated in FIG. 6. For this purpose, it may be placed in a special stand or fixture 70 shown in perspective. This fixture shown has a base and an adapter 72 with a slot 73 for inserting a merchandise ticket 75 which, for example, may be attached to a string 76. When inserted into the slot 73 and then withdrawn, the ticket will be decoded or read out. A second support 76 and clamps 77 secure the reader in proper position.

FIG. 7 illustrates a schematic arrangement for translating light impulses generated by the printed code on the ticket and imaged onto the photocell array. The light impulses received by the photocell array 30 are processed in a conventional manner such as through an amplifier 81 and decoder 82 to produce the desired electronic signal into a computer 83, for example.

While the invention has been described with reference to a particular embodiment in order to facilitate a full, clear and concise explanation, various modifications apparent to those skilled in the art may be made without departing from the scope and spirit of the invention.

What is claimed is:

1. A hand held reader for scanning a printed code by photo optical means comprising:

a housing which substantially excludes extraneous light equipped with an opening or window at one end to be placed in direct contact with a coded document for viewing at any given moment at least one line of printed code of the document to be read;

a light source in said housing contiguous to said window and positioned to provide direct illumination, through said window, for a line of printed code of a document over which the reader is placed as the reader is drawn over the document;

a linear array of photoelectric detectors positioned at the opposite end of said reader housing from said window and in alignment to receive through said window and through a lens, a line of images from a document to be read;

a lens, shielded from direct rays from said light source for focusing printed images onto said photoelectric detectors, situated between said window and said detectors;

means to prevent rays from said light source from directly reflecting on said detectors; and means for electrically converting into intelligible information impulses received by the photoelectric detectors.

2. The reader of claim 1 further characterized in the improvement comprising an L-shaped housing with a mirror disposed between said window and said photoelectric detectors to reflect, at an angle through said lens, images picked up through said window.

3. The reader of claim 1 which is provided with a handle attached to said reader at a convenient angle.

4. The reader of claim 2 which is provided with a handle which comprises a closed loop and includes a base portion to retain the reader in positioned alignment on a flat surface.

5. The reader of claim 1 in combination with a detachable retaining base which holds the reader in position to receive a document fed thereto for reading.

* * * * *